United States Patent [19]

Shirahata et al.

[11] Patent Number: 4,652,460
[45] Date of Patent: Mar. 24, 1987

[54] PROCESS FOR PREPARING MAGNETIC RECORDING MEDIUM

[75] Inventors: Ryuji Shirahata; Yoshihiro Arai, both of Kanagawa, Japan

[73] Assignee: Fuji Photo Film Co., Ltd., Kanagawa, Japan

[21] Appl. No.: 850,309

[22] Filed: Apr. 10, 1986

[30] Foreign Application Priority Data

Apr. 11, 1985 [JP] Japan .................................. 60-77303

[51] Int. Cl.$^4$ .............................................. B05D 3/06
[52] U.S. Cl. ...................................... 427/39; 427/132; 427/251; 427/296
[58] Field of Search .................. 427/39, 132, 251, 296

[56] References Cited

U.S. PATENT DOCUMENTS 4,477,489 10/1984 Yanai et al. .......................... 427/132
4,511,594 4/1985 Yanai ..................................... 427/39

Primary Examiner—Bernard D. Pianalto
Attorney, Agent, or Firm—Sughrue, Mion, Zinn, Macpeak & Seas

[57] ABSTRACT

A process for preparing a magnetic recording medium by forming a ferromagnetic thin film on a non-magnetic support moving along a rotating drum by a vapor deposition method is disclosed, comprising introducing a first oxidizing gas and then introducing a second oxidizing gas near the surface of the ferromagnetic film moving along the rotating drum and glow-discharging the second oxidizing gas, using a charging energy (G) for glow discharge per unit area of a ferromagnetic thin film surface of 1.0 W·sec/cm$^2$ or more.

10 Claims, 1 Drawing Figure

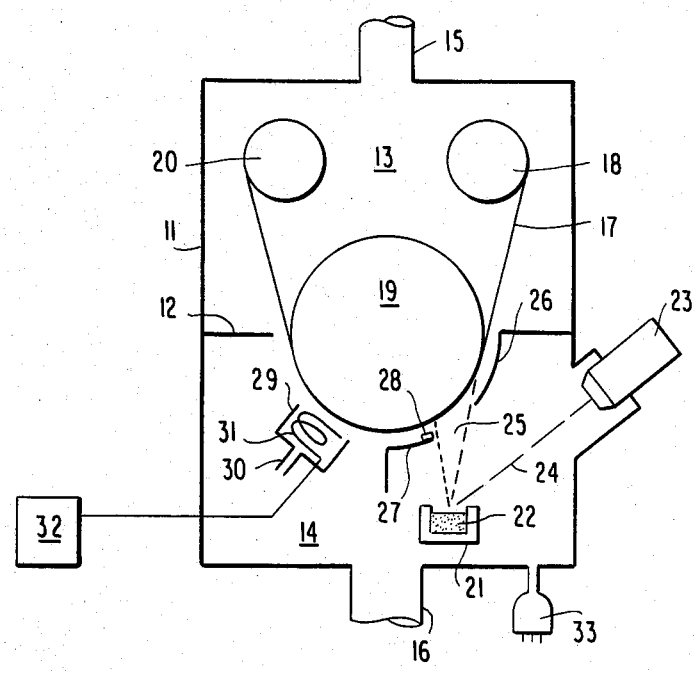

PROCESS FOR PREPARING MAGNETIC RECORDING MEDIUM

FIELD OF THE INVENTION

The present invention relates to a process for preparing a magnetic recording medium comprising a non-magnetic support having vapor-deposited thereon a ferromagnetic thin film as a magnetic recording layer. More particularly, it relates to a method for preparing a magnetic recording medium having an improved anti-corrosive property and an improved surface friction coefficient.

BACKGROUND OF THE INVENTION

Widely used coated type magnetic recording media are typically prepared by dispersing magnetic oxide materials as magnetic particles, such as $\gamma\text{-}Fe_2O_3$, Co-doped $\gamma\text{-}Fe_2O_3$, $Fe_3O_4$, Co-doped $Fe_3O_4$, Berthollide compounds composed of $\gamma\text{-}Fe_2O_3$, and $Fe_3O_4$, Co-doped Berthollide compounds or $CrO_2$ or magnetic materials of magnetic alloy particles mainly containing Fe, Co, or Ni in an organic binder such as copolymers of vinyl chloride and vinyl acetate, copolymers of styrene and butadiene, an epoxy resin or a polyurethane resin, coating the thus-prepared magnetic coating composition on a non-magnetic support, and drying it has widely been used.

Recently, with the increased demand for high density recording, attention has been drawn to a magnetic recoring medium of a ferromagnetic thin metal film type which is prepared by a vacuum evaporation method, a sputtering method, or an ion plating method without using a binder, and such non-binder type magnetic recording medium has been developed to realize it to a practical use.

Metal oxides having small saturation magnetization are conventionally used as a magnetic material for a coating type magnetic recording medium and the volume content of the magnetic material in a magnetic layer is only from 30 to 50%. Therefore, such magnetic recording medium is not suitable for high density recording with high output. Further, manufacturing steps thereof are complicated, and substantial auxiliary equipment is necessary for recovering used solvents and for preventing air pollution. On the other hand, a thin metal film type magnetic recording medium can be formed as an extremely thin film of ferromagnetic metal having a larger saturation magnetization than that of a magnetic oxide material, without containing non-magnetic materials such as an organic binder. With higher density recording, a magnetic head for recording and replaying having a gap length of 1.0 μm or less has been used, and recording depth on a magnetic recording layer has had a tendency to be shallower. Therefore, a thin metal film type magnetic recording medium is the most suitable as a magnetic recording medium for high density recording with high output, because the whole thickness of the magnetic layer is utilized for recording magnetic signals. A thin film of a thin metal film type magnetic recording medium is formed by a vacuum evaporation method, because the vacuum evaporation method has advantages such as that rate for forming a film is fast, manufacturing processes are simple, and that this method is a dry process where treatment for waste solution is unnecessary. Among vacuum evaporation methods, a vacuum evaporation method wherein a vapor beam of a magnetic metal is vapor-deposited on a surface of a non-magnetic support by oblique incident evaporation method is practically the most suitable, because steps and apparatus thereof are comparatively simple, and a film having good magnetic properties can be obtained.

However, the magnetic recording medium comprising a ferromagnetic thin film prepared by a vacuum evaporation method has problems regarding an anti-corrosive property and surface-friction coefficient. Corrosion occurring with passage of time on a magnetic recording medium while it is stored leads to degradation and even erasure signals recorded on the magnetic recording medium and therefore corrosion should be prevented. Additionally, the friction coefficient on a surface of a magnetic recording medium must be low so that the magnetic recording medium has a smooth contact with a magnetic head or a guide.

Many methods have been proposed to improve the anti-corrosive property of a magnetic recording medium by vapor deposition; examples of such methods are disclosed in Japanese Patent Application (OPI) Nos. 198543/82 and 17544/83 (the term "OPI" as used herein means "published unexamined Japanese patent application"). These methods comprise forming a ferromagnetic thin film by a vapor deposition method on a surface of a non-magnetic base which is travelling along a periphery of a rotating drum, and then exposing a surface of the ferromagnetic thin film moving along the rotating drum to a glow discharge atmosphere using oxide gas. Decrease of residual magnetic flux density occurring while a magnetic recording medium is stored at high temperature and high humidity can be improved by this method, but weather resistance under conditions other than the above cannot always be improved. Furthermore, there is a problem with respect to the friction coefficient on a surface of a vapor deposited film.

SUMMARY OF THE INVENTION

An object of the present invention is to provide a process for preparing a magnetic recording medium by a vapor deposition method having a good anti-corrosive property and surface friction coefficient.

The object of the present invention can be attained by a process for preparing a magnetic recording medium by forming a ferromagnetic thin film on a non-magnetic support moving along a rotating drum by a vapor deposition method, comprising introducing a first oxidizing gas and then introducing a second oxidizing gas near the surface of the ferromagnetic film moving along the rotating drum and glow-discharging the second oxidizing gas, using a charging energy (G) for glow discharge per unit area of a ferromagnetic thin film surface of 1.0 $W\cdot sec/cm^2$ or more.

BRIEF DESCRIPTION OF THE DRAWING

The drawing illustrates an apparatus for carrying out the process of the invention.

DETAILED DESCRIPTION OF THE INVENTION

The present invention is illustrated in more detail below.

The object of the present invention can be attained by the adjusting charging energy (G) used for glow discharge per unit area of a ferromagnetic thin film surface to 1.0 $W\cdot sec/cm^2$ or more in a process for preparing a magnetic recording medium which comprises forming a ferromagnetic thin film by a vapor deposition method on a non-magnetic support travelling along a rotating drum, introducing a second oxidizing gas near the ferromagnetic thin film moving along the rotating drum, and glow-discharging the second oxidizing gas at the noted charging energy. More preferably, the magnetic recording medium of the present invention can be obtained by forming a ferromagnetic thin film on a non-magnetic support moving along a rotating drum by the oblique incident evaporation method while introducing a first oxidizing gas near the place where vapor flow of ferromagnetic metal is deposited at the minimum incident angle. More preferably, the magnetic recording medium can be also obtained by adjusting $\Delta p_2/\Delta p_1$ to 5/1 or more, wherein $\Delta p_1$ is the increase of pressure due to introducing the first oxidizing gas near the place where the vapor flow of ferromagnetic metal is deposited at the minimum incident angle and $\Delta p_2$ is the increase of pressure due to introducing the second oxidizing gas near the surface of a vapor-deposited ferromagnetic thin film.

The present invention will be illustrated by the accompanying drawing.

The drawing schematically shows one embodiment of an apparatus for practicing the method for preparing a magnetic recording medium in the present invention. A vacuum box 11 is divided by a partition 12 into an upper chamber 13 for rewinding and sending out a roll film and a vapor deposition chamber 14, and each room has vacuum exhaust openings 15 and 16, respectively. A non-magnetic tape support 17 is moved from a unwinding roll 18 around a rotating drum 19 and is wound by a winding roll 20. Under the rotating drum 19, an evaporation boat 21 is installed and magnetic material 22 is heated with irradiation of electron beam 24 emitted from an electron gun 23, and is thereby evaporated. Vapor flow 25 of the magnetic material reaches the surface of a non-magnetic support 17 which is travelling along a rotating drum 19 and is deposited as a ferromagnetic vapor-deposited film. Plates (masking shields identified by the reference numerals 26 and 27) are installed in the vicinity of a rotating drum 19 so that incident angles $\theta_{max}$ and $\theta_{min}$ of vapor flow 25 to the surface of the non-magnetic support 17 is adjusted to predetermined values, respectively. Nozzle 28 is provided in the vicinity to where vapor flow reaches with minimum incident angle $\theta_{min}$ to introduce a first oxidizing gas. A hood 29 is provided in the vicinity of a rotating drum 19 and a second oxidizing gas is introduced from a gas introducing pipe 30 onto a surface of ferromagnetic vapor deposited film on a non-magnetic support 17. In the hood 29, R.F. (radio frequency) discharge coil 31 is provided and is connected to R.F. electric source 32. Pressure of the vapor deposition chamber 14 is measured by a vacuum gauge 33. Charging energy (G) used for glow discharge per unit area of the surface of a ferromagnetic thin film is determined by the equation $G = E/w \times v$, wherein E (W) is the power charged with the R.F. discharge coil, w (cm) is the width of a non-magnetic support 17 which is charged with glow discharge, and v (cm/sec) is the velocity along rotating drum 19. The inventors of the present invention have found that an anti-corrosive property and surface friction coefficient of a magnetic recording medium are significantly improved when a glow discharge treatment is conducted under the condition that charging energy (G) used for glow discharge is 1.0 W·sec/cm² or more, preferably from 1.0 to 5.0 W·sec/cm², and more preferably from 1.0 to 3.0 W·sec/cm².

In the present invention, the increase of pressure $\Delta p_1$ is determined by the equation $\Delta p_1 = p_1 - p_0$, wherein $P_0$ is the pressure of the vapor deposition chamber excluding pressure attributable to gasses introduced via the nozzle 28 and gas-introducing pipe 30, and $p_1$ is the pressure of the vapor deposition chamber to which a first oxidizing gas is introduced only from a nozzle 28. The increase of pressure $\Delta p_2$ is determined by the equation $\Delta p_2 = p_2 - p_1$, wherein $p_2$ is the pressure of the vapor deposition chamber to which the first and second oxidizing gases are introduced from a nozzle 28 and a gas-introducing pipe 30. In this case, $p_0$ is generally from $1 \times 10^{-6}$ to $2 \times 10^{-4}$ Torr, preferably from $1 \times 10^{-6}$ to $1 \times 10^{-4}$ Torr, $p_1$ is generally from $8 \times 10^{-5}$ to $8 \times 10^{-4}$ Torr, and preferably from $1 \times 10^{31}$ $^4$ to $6 \times 10^{-4}$ Torr, and $p_2$ is generally from $4 \times 10^{-4}$ to $5 \times 10^{-3}$ Torr, and preferably from $5 \times 10^{-4}$ to $3 \times 10^{-3}$ Torr. The inventors of the present invention found that an anti-corrosive property of a magnetic recording medium can be further improved when the magnetic recording medium is prepared under the condition that charging energy (G) used for glow discharge is adjusted to 1.0 W·sec/cm² or more, and additionally, particularly that the ratio $\Delta p_2/\Delta p_1$ is adjusted to 5/1 or more, preferably from 5/1 to 50/1, and more preferably from 5/1 to 30/1.

A suitable oxidizing gas for each the first and second oxidizing gases which can be used in the present invention comprises an oxygen gas, an oxygen-containing compound gas such as $NO_2$, $CO_2$, $H_2O$, etc., or a gas mixture of oxygen gas and another gas such as $O_2 + Ar$, $O_2 + N_2$, etc.

Vapor deposition as referred to in the present invention includes not only an ordinary vacuum evaporation method as disclosed in U.S. Pat. No. 3,342,632, but also any method known for forming a thin film on a support in an atmosphere of evaporated molecules having a mean free path elongated by ionizing or accelerating vapor flow by application of an electric field or a magnetic field, or by an electron beam exposure. For example, an electric field vapor deposition method as disclosed in U.S. Pat. No. 4,354,908 and an ionized vapor deposition method as disclosed in U.S. Pat. Nos. 3,406,040 and 3,573,981, Japanese Patent Publication Nos. 20484/71 and 26579/72, and Japanese Patent Application (OPI) Nos. 33890/74, 34483/74, and 535/74 can be employed in the present invention.

A magnetic recording medium of the present invention can be a horizontally magnetizable recording medium which is magnetized in the horizontal direction to the surface of the magnetic film, and can be a vertically magnetizable recording medium which is magnetized in the vertical direction to the surface of the magnetic film. For the horizontally magnetizable recording medium, the oblique incident evaporation method using Co-Ni type magnetic metal as shown in the drawing is used and for the vertically magnetizable recording medium, vapor deposition method with vertical incident evaporation method using Co-Cr magnetic metal or Co type magnetic metal is used.

The oblique incident evaporation method referred to in the present invention means a method which comprises emitting vapor flow of metal materials for forming a film toward a normal line at a surface of a support with a certain incident angle $\theta$ and depositing a vapor-deposited thin film on the surface of the support. In the present invention, upon forming a magnetic thin film by an oblique incident evaporation method, vapor deposition starts with a maximum incident angle ($\theta_{max}$) and the incident angle $\theta$ is decreased continuously as the support is travelling until vapor deposition of a magnetic thin film is finished with a minimum incident angle ($\theta_{min}$). The maximum incident angle ($\theta_{max}$) is preferably from 50° to 90°, and the minimum incident angle ($\theta_{min}$) is preferably from 20° to 75°.

Vapour-deposited magnetic metal film is required to have a thickness thick enough to produce sufficient output and to conduct high density recording, that is, the thickness of vapor-deposited magnetic metal film is generally about from 0.02 μm to 5.0 μm, and preferably from 0.05 μm to 2.0 μm.

Magnetic metal materials used in the present invention are metals such as Fe, Co, or Ni, and ferromagnetic alloys such as Fe-Co, Fe-Ni, Co-Ni, Fe-Co-Ni, Fe-Rh, Fe-Cu, Co-Cu, Co-Au, Co-Y, Co-La, Co-Pr, Co-Gd, Co-Sm, Co-Pt, Ni-Cu, Fe-Cr, Co-Cr, Ni-Cr, Fe-Co-Cr, Ni-Co-Cr, and Fe-Co-Ni-Cr.

Supports used in the present invention are preferably plastic support such as polyethylene terephthalate, polyimide, polyamide, polyvinyl chloride, cellulose triacetate, polycarbonate, or polyethylene terephthalate. The thickness of the support is generally from 3 μm to 50 μm, and preferably from 5 μm to 30 μm.

If desired, a lubricating layer or a backing layer provided on the surface of a support opposite to a magnetic layer may be provided, as described, e.g., in U.S. Pat. Nos. 4,486,500, 4,476,195, 4,456,661, 4,448,843, 4,391,874, and 4,390,601.

As described in U.S. Pat. Nos. 4,245,008, 4,489,117, 4,226,681, and 4,074,016, an organic or inorganic layer may also be provided between a vapor deposited magnetic metal film and a support.

The present invention will be illustrated in more detail by the following Examples, but it should not be limited thereto.

EXAMPLE 1

Using a continuous-roll coating system for vacuum evaporation as shown in the drawing, a magnetic tape was prepared by forming a Co-Ni (Ni content: 20 wt%) vapor deposited magnetic film on a polyethylene terephthalate film having a thickness of 9.5 μm by an oblique incident evaporation method. The magnetic film was prepared so that width of a film was 300 mm, the speed of carrying a film was 40 m/min, $\theta_{max}$ was 90°, $\theta_{min}$ was 35° and the film thickness was 0.15 μm. Tape samples having different charging energy (G) used for glow discharge on a magnetic thin film per unit area were prepared by changing the power charged at R.F. coil 31. At the same time, various tape samples were prepared by changing the introduced amounts of oxygen gas through a gas-introducing pipe 30, thereby changing $\Delta p_2/\Delta p_1$, while oxygen gas introduced through the nozzle 28 was constant, i.e., at 380 ml/min. When oxygen gas was introduced only through a nozzle 28 at 380 ml/min., the pressure $p_1$ of the vapor deposition chamber was $1.1 \times 10^{-4}$ Torr and $\Delta p_1$ ws $5 \times 10^{-5}$ Torr. An anti-corrosive property and surface friction coefficient of the thus-obtained magnetic tapes were measured. An anti-corrosive property was measured in accordance with the salt spray test method as defined in JIS Z-2371. That is, occurrence of rust was checked and evaluated using five-grade evaluation system after the salt spray test using 5 wt% salt water was conducted for 12 hour. Surface friction coefficient of the magnetic thin film which was carried at a speed of 14 mm/sec around the stainless steel pole made of SUS 304 (i.e., 304 as defined by American Iron and Steel Institute) having 5 mm diameter was measured.

The five-grade evaluation of the anti-corrosive property, and the test method and the evaluation of the surface friction coefficient of the magnetic thin film are shown below, and the results are shown in Table 1.

Five-Grade Evaluation of Anti-Corrosive Property

1. Significant rust is observed with naked eye.
2. Rust is observed with naked eye.
3. Rust is not observed with naked eye.
4. Rust is slightly observed with a microscope ($\times 50$).
5. Rust is not observed with a microscope ($\times 50$).

In the five-grade evaluation of anti-corrosive property, the evaluation 4 and 5 are suitable for practical use.

TABLE 1

| Pressure (Torr) | $\Delta p_2/\Delta p_1$ | R.F. Power (kW) |||||| 
|---|---|---|---|---|---|---|---|
| | | 1.0 | 1.6 | 2.0 | 2.6 | 3.6 | 4.4 |
| | | Charging Energy G (W · sec/cm$^2$) ||||||
| | | 0.5 | 0.8 | 1.0 | 1.3 | 1.8 | 2.2 |
| $1.1 \times 10^{-4}$ | 0 | 1 | 2 | 4 | 4 | 4 | 4 |
| | | 0.44 | 0.40 | 0.30 | 0.30 | 0.29 | 0.29 |
| $2.1 \times 10^{-4}$ | 2/1 | 1 | 2 | 4 | 4 | 4 | 4 |
| | | 0.44 | 0.39 | 0.30 | 0.29 | 0.29 | 0.28 |
| $3.6 \times 10^{-4}$ | 5/1 | 2 | 2 | 4 | 4 | 5 | 5 |
| | | 0.40 | 0.37 | 0.28 | 0.27 | 0.27 | 0.28 |
| $5.6 \times 10^{-4}$ | 9/1 | 2 | 2 | 4 | 5 | 5 | 5 |
| | | 0.42 | 0.39 | 0.29 | 0.27 | 0.27 | 0.27 |
| $8.1 \times 10^{-4}$ | 14/1 | 2 | 3 | 4 | 5 | 5 | 5 |
| | | 0.40 | 0.35 | 0.27 | 0.28 | 0.27 | 0.27 |

Upper column: anti-corrosive property
Lower column: surface friction coefficient Surface Friction Coefficient Sample tapes were slit to a width of 8 mm and were wrapped around a stainless steel pole at the wrapping angle of 180° in which the tape tension measured for sending the tape around the pole was $T_1$ and the tape tension for pulling it out was $T_2$.

The surface friction coefficient ($\mu$) was calculated by formula $T_2/T_1 = \exp(\mu\pi)$. $T_1$ and $T_2$ were measured at 23° C. and 65% RH. That is, as the surface friction coefficient is smaller, running property is better. Accordingly, the surface friction coefficient of 0.3 or less is suitable for practical use.

EXAMPLE 2

Using a continuous-roll coating system for vacuum evaporation as shown in the drawing, a magnetic tape was prepared by forming a CoCr (Cr content: 15 wt%) vapor deposited magnetic thin film on a polyethylene terephthalate film having 12.5 μm thickness by an oblique incident evaporation method. The magnetic thin film was prepared so that width of a film was 600 mm, $\theta_{max}$ was 90°, $\theta_{min}$ was 40°, and the thickness of the magnetic thin film was 0.22 μm. Power charged into R.F. coil 31 was 4.0 kW. Various samples having different charged energy (G) used for glow discharge per unit area on a surface of a magnetic thin film were prepared by changing the carrying speed. Various tape samples were prepared by changing the introduced amounts of oxygen gas through a gas-introducing pipe 30, thereby changing $\Delta p_2/\Delta p_1$, while oxygen was from a nozzle 28 was introduced at 500 ml/min. When oxygen gas was introduced only through a nozzle 28, the pressure p1 of the vapor deposition chamber was $9 \times 10^{-5}$ Torr and $\Delta p_1$ was $4 \times 10^{-5}$ Torr. An anti-corrosive property and surface friction coefficient of the thus-obtained magnetic tapes were measured in the same manner as in Example 1. The results as shown in Table 2.

TABLE 2

| Pressure (Torr) | $\Delta p_2/\Delta p_1$ | Carrying speed (m/min) | | | | | |
|---|---|---|---|---|---|---|---|
| | | 100 | 50 | 40 | 32 | 25 | 20 |
| | | Charging Energy G (W · sec/cm²) | | | | | |
| | | 0.4 | 0.8 | 1.0 | 1.25 | 1.6 | 2.0 |
| $0.9 \times 10^{-4}$ | 0 | 1 | 1 | 3 | 3 | 4 | 4 |
| | | 0.44 | 0.42 | 0.30 | 0.30 | 0.29 | 0.28 |
| $2.1 \times 10^{-4}$ | 3/1 | 1 | 1 | 4 | 4 | 4 | 4 |
| | | 0.44 | 0.42 | 0.30 | 0.29 | 0.29 | 0.27 |
| $2.9 \times 10^{-4}$ | 5/1 | 1 | 1 | 4 | 4 | 5 | 5 |
| | | 0.43 | 0.39 | 0.28 | 0.27 | 0.28 | 0.27 |
| $4.9 \times 10^{-4}$ | 10/1 | 1 | 2 | 4 | 5 | 5 | 5 |
| | | 0.40 | 0.37 | 0.27 | 0.27 | 0.27 | 0.26 |
| $6.9 \times 10^{-4}$ | 15/1 | 2 | 2 | 4 | 5 | 5 | 5 |
| | | 0.40 | 0.38 | 0.27 | 0.27 | 0.27 | 0.26 |

Upper column: anti-corrosive property
Lower column: surface friction coefficient It is apparent from the results as shown above that an excellent anti-corrosive property and surface friction coefficient were obtained when a magnetic recording medium was prepared under conditions that charging energy (G) used for glow discharge per unit area of a surface of a ferromagnetic thin film was 1.0 W·sec/cm² or more.

Accordingly, in accordance with the method of the present invention, a thin metal film type magnetic recording medium having significantly improved anti-corrosive property and surface friction coefficient can be obtained, which is very advantageous from the practical point of view.

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium by forming a ferromagnetic thin film on a non-magnetic support moving along a rotating drum by a vapor deposition method, comprising introducing a first oxidizing gas and then introducing a second oxidizing gas near the surface of the ferromagnetic film moving along the rotating drum and glow discharging the second oxidizing gas, using a charging energy (G) for glow discharge per unit area of a ferromagnetic thin film surface of 1.0 to 5.0 W·sec/cm², wherein the ferromagnetic thin film is formed on the non-magnetic support moving along the rotating drum by an oblique incident evaporation method while introducing the first oxidizing gas near the place where vapor flow of ferromagnetic metal is deposited at the minimum incident angle.

2. A process as in claim 1, wherein the minimum incident angle is from 20° to 75°.

3. A process as in claim 1, wherein a ratio $\Delta p_2/\Delta p_1$ is adjusted to 5/1 or more, in which $\Delta p_1$ is the increase of pressure due to introducing the first oxidizing gas near the place where the vapor flow of ferromagnetic metal is deposited at the minimum incident angle and $\Delta p_2$ is the increase of pressure due to introducing the second oxidizing gas near the surface of a vapor-deposited ferromagnetic thin film.

4. A process as in claim 3, wherein the ratio $\Delta p_2/\Delta p_1$ is from 5/1 to 50/1.

5. A process as in claim 3, wherein the ratio $\Delta p_2/\Delta p_1$ is from 5/1 to 30/1.

6. A process as in claim 3, wherein said ferromagnetic thin film is formed by said vapor deposition method, whereafter said first oxidizing gas is introduced in a first area after formation of said ferromagnetic thin film; said ferromagnetic thin film then travels from said first area to a second area, and in said second area said second non-oxidizing gas is passed through means for glow discharging the second oxidizing gas, said vapor deposition means and said means for glow discharging being operated under conditions such that the ratio $\Delta P_2/\Delta P_1$ is met.

7. A process as in claim 6, wherein said first and second oxidizing gases are selected from $O_2$, $NO_2$, $CO_2$, $H_2O$ or a gas mixture of oxygen and another gas selected from the group consisting of Ar and $N_2$.

8. A process as in claim 6, wherein the pressure in said first area and second area is in the range of from $1 \times 10^6$ to $2 \times 10^4$ Torr excluding the pressure attributable to said first oxidizing gas and said second oxidizing gas.

9. A process as in claim 1, wherein the charging energy (G) used for glow discharge per unit area of a ferromagnetic thin film is from 1.0 to 3.0 W·sec/cm².

10. A process as in claim 1, wherein said first and second oxidizing gases are selected from the groups consisting of an oxygen gas, an oxygen-containing compound gas, and a gas mixture of oxygen gas and another gas.

* * * * *